United States Patent
He et al.

(10) Patent No.: US 9,740,349 B2
(45) Date of Patent: Aug. 22, 2017

(54) TOUCH DRIVING APPARATUS, TOUCH DRIVING METHOD AND TOUCH DISPLAY SYSTEM

(71) Applicant: HIMAX TECHNOLOGIES LIMITED, Tainan (TW)

(72) Inventors: Jia-Ming He, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 183 days.

(21) Appl. No.: 14/842,385

(22) Filed: Sep. 1, 2015

(65) Prior Publication Data

US 2017/0060295 A1  Mar. 2, 2017

(51) Int. Cl.
  *G06F 3/045* (2006.01)
  *G06F 3/044* (2006.01)
  *G06F 3/041* (2006.01)

(52) U.S. Cl.
  CPC ............ *G06F 3/044* (2013.01); *G06F 3/0416* (2013.01); *G06F 3/0418* (2013.01)

(58) Field of Classification Search
  CPC ....................................................... G06F 3/044
  USPC ........................................................ 345/174
  See application file for complete search history.

(56) References Cited

U.S. PATENT DOCUMENTS

| | | | | |
|---|---|---|---|---|
| 9,223,425 B1* | 12/2015 | Kim | ....................... | G06F 3/0412 |
| 9,348,476 B2* | 5/2016 | Lee | ......................... | G06F 3/044 |
| 2012/0056835 A1* | 3/2012 | Choo | .................... | G06F 3/0412 345/173 |
| 2012/0287107 A1* | 11/2012 | Zhao | .................... | G09G 3/3655 345/212 |
| 2013/0335342 A1* | 12/2013 | Kim | ...................... | G06F 3/0412 345/173 |

* cited by examiner

*Primary Examiner* — Jason Olson
(74) *Attorney, Agent, or Firm* — J.C. Patents

(57) ABSTRACT

A touch driving apparatus, a touch driving method, and a touch display system are provided. The touch display system includes a touch display panel, a common voltage generator, and a touch driving apparatus. The touch driving apparatus includes a driving circuit, a capacitor, and a sensing circuit. An output terminal of the driving circuit is electrically connected to a driving electrode line of the touch display panel. During a touch driving period, the driving circuit outputs a driving signal to the driving electrode line. A first terminal of the capacitor is electrically connected to a common electrode line of pixels of the touch display panel. An input terminal of the sensing circuit is electrically connected to a second terminal of the capacitor. During a touch driving period, the sensing circuit senses the common electrode line through the capacitor to detect a touch event of the touch display panel.

9 Claims, 3 Drawing Sheets

TOUCH DRIVING APPARATUS, TOUCH DRIVING METHOD AND TOUCH DISPLAY SYSTEM

FIELD OF INVENTION

The invention relates to a touch apparatus; more particularly, the invention relates to a touch driving apparatus, a touch driving method, and a touch display system.

DESCRIPTION OF RELATED ART

In an in-cell touch display panel (hereinafter referred to as the touch display panel), a common electrode shared by a plurality of pixels not only transits a common voltage VCOM to the liquid crystal capacitor of the pixels during a display driving period but also acts as a touch sensing electrode during a touch driving period. In general, the display driver of the touch display panel is manufactured by performing the high-voltage process; that is, the common voltage VCOM of the common electrode may be the high voltage (e.g., 8V). Hence, the touch driver (or the touch driving apparatus) coupled to the common electrode should also be manufactured by performing the high-voltage process, so as to tolerate the high-voltage level of the common voltage VCOM. Compared to the integrated circuits made by performing the low-voltage process, the integrated circuits made by performing the high-voltage process are often expensive. If the display driver made by performing the high-voltage process is applied together with the touch driver (or the touch driving apparatus) made by performing the low-voltage process, the high voltage of the common electrode may cause damage to the touch driver.

SUMMARY

The invention is directed to a touch driving apparatus, a touch driving method, and a touch display system. The touch driving apparatus discussed herein may be manufactured by performing a low-voltage process and can employ the common electrode with the high voltage as a touch sensing electrode.

In an embodiment of the invention, a touch driving apparatus that includes a driving circuit, a capacitor, and a sensing circuit is provided. An output tell iinal of the driving circuit is electrically connected to a driving electrode line of the touch display panel. During a touch driving period, the driving circuit outputs a driving signal to the driving electrode line. A first terminal of the capacitor is electrically connected to a common electrode line of a plurality of pixels of the touch display panel. An input terminal of the sensing circuit is electrically connected to a second terminal of the capacitor. During a touch driving period, the sensing circuit senses the common electrode line through the capacitor, so as to detect touch events of the touch display panel.

In an embodiment of the invention, a touch driving method is provided. The touch driving method includes: outputting a driving signal to a driving electrode line of a touch display panel by a driving circuit during a touch driving period; filtering out a direct-current (DC) portion of a common electrode line of a plurality of pixels of the touch display panel and transmitting an alternating-current (AC) portion of the common electrode line by a capacitor; sensing the transmitted AC portion of the common electrode line by a sensing circuit during the touch driving period, so as to detect a touch event of the touch display panel.

In an embodiment of the invention, a touch display system that includes a touch display panel, a common voltage generator, and a touch driving apparatus is provided. The touch display panel includes a plurality of pixels, at least one driving electrode line, and at least one common electrode line. The common voltage generator is electrically connected to the common electrode line. The touch driving apparatus includes a driving circuit, a capacitor, and a sensing circuit. An output terminal of the driving circuit is electrically connected to the driving electrode line, so as to output a driving signal to the driving electrode line during a touch driving period. A first terminal of the capacitor is electrically connected to a common electrode line of the pixels. An input terminal of the sensing circuit is electrically connected to a second terminal of the capacitor. During the touch driving period, the sensing circuit senses the common electrode line through the capacitor, so as to detect a touch event of the touch display panel.

In view of the above, according to an embodiment of the invention, the capacitor is employed to filter out the DC portion of the common electrode line of the touch display panel and transmit the AC portion of the common electrode line to the sensing circuit of the touch driving apparatus. Hence, the touch driving apparatus may be manufactured by performing a low-voltage process and can employ the common electrode with the high voltage as a touch sensing electrode.

Several exemplary embodiments accompanied with figures are describe in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
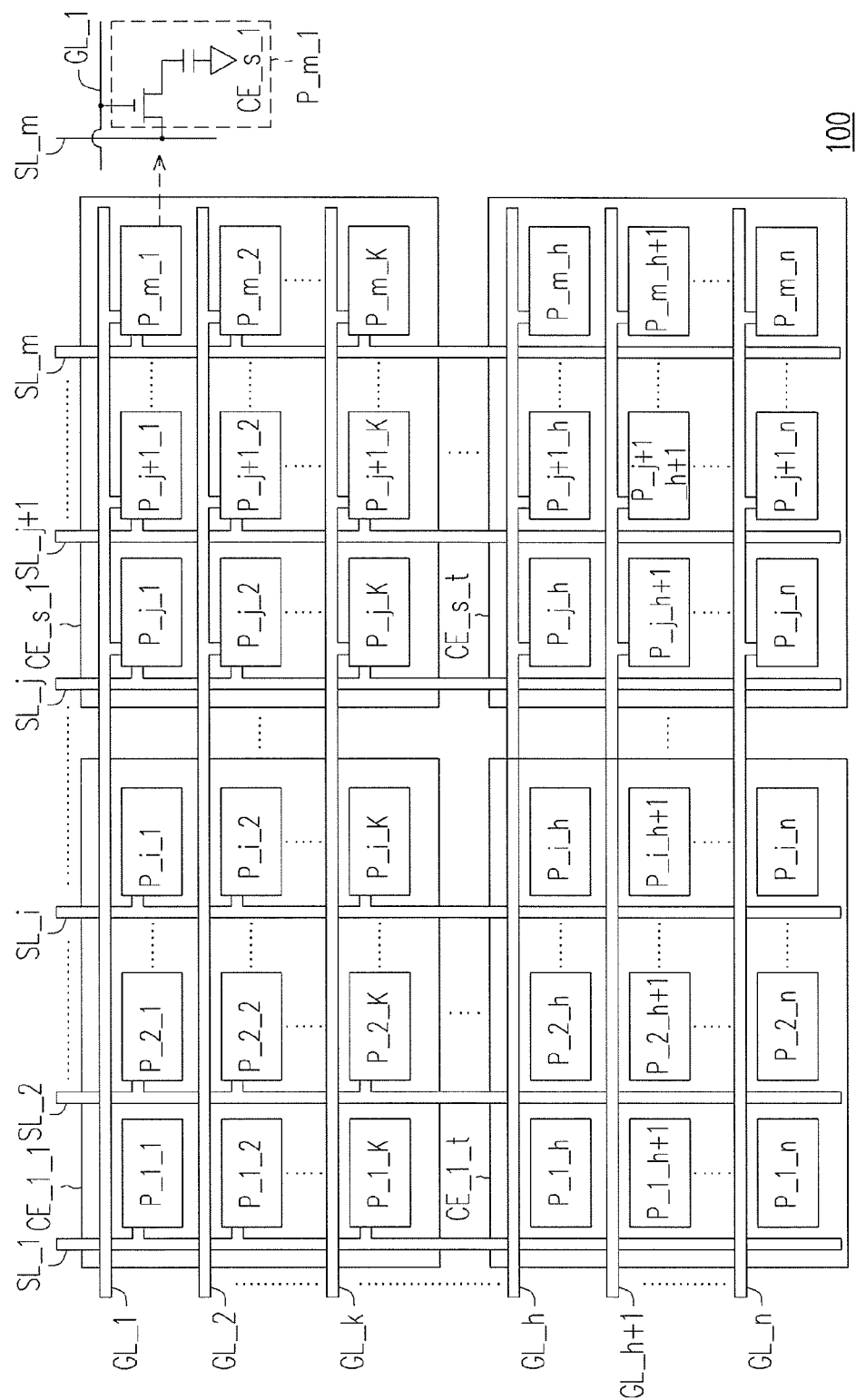
FIG. 1 is a schematic diagram illustrating a circuit layout of an in-cell touch display panel.

The word "couple" (or connect) in the description and claims may refer to any direct or indirect connection. For instance, in the description and claims, if a first device is coupled to (or connected to) a second device, it means that the first device may be directly connected to the second device or may be indirectly connected to the second device through another device or by another connection means. Moreover, elements/components/steps with same reference numbers represent the same or similar parts in the drawings and embodiments. The descriptions of the same elements/components/steps in an embodiment of the invention may be applied to the descriptions of the same elements/components/steps in another embodiment.

FIG. 1 is a schematic view illustrating a circuit layout of an in-cell touch display panel (hereinafter referred to as the touch display panel 100). The touch display panel 100 shown in FIG. 1 is constituted by two substrates, and a liquid crystal material fills the space between the two substrates and serves as a liquid crystal layer. The touch display panel 100 has s*t common electrodes (e.g., the common electrodes CE_1_1, CE_s_1, CE_1_t and CE_ s_t shown in FIG. 1), m source lines (or data lines, e.g., the source lines SL_1, SL_2, . . . , SL_i, . . . , SL_j, SL_j+1, . . . , and SL_m shown in FIG. 1), n gate lines (or scan lines, e.g., GL_1, GL_2, . . . , GL_k, . . . , GL_s, GL_s+1, . . . , and GL_n shown in FIG. 1), and pixels (e.g., the pixels P_1_1, P_2_1, . . . , P_i_1, . . . , P_j_1, P_j+1_1, . . . , P_m_1, P_1_2, P_2_2, . . . , P_i_2, . . . , P_j_2, P_j+1_2, . . . , P_m_2, . . . , P_1_$k$, P_2_$k$, . . . , P_i_k, . . . , P_j_k, P_j+1_k, . . . , P_m_k, . . . , P_1_$h$, P_2_$h$, . . . , P_i_h, . . . , P_j_h, P_j+1_h, . . . , P_m_h, P_1_$h$+1, P_2_$h$+1, . . . , P_i_h+1, . . . , P_j_h+1, P_j+1_h+1, . . . , P_m_h+1, . . . , P_1_$n$, P_2_$n$, . . . , P_i_n, P_j_n, P_j+1_n, . . . , and P_m_n). Here, s, t, i, j, m, k, s, and n are integers and can be determined according to design requirements.

The source lines SL_1-SL_m are perpendicular to the gate lines GL_1-GL_n. The pixels P_1_1-P_m_n are arranged on the touch display panel 100 in form of a matrix. FIG. 1 illustrates an exemplary circuit diagram of the pixel P_m_1, and the circuit diagrams of other pixels can be deduced therefrom. A gate driver (not shown) is coupled to the gate lines GL_1-GL_n of the touch display panel 100. The gate driver (not shown) can drive (i.e., scan) each of the gate lines GL_1-GL_n one by one during the display driving period. A source driver (not shown) is coupled to the gate lines SL_1-SL_m of the touch display panel 100. In consideration of the scanning time sequence of the gate driver (not shown), the source driver (not shown) can write source driving signals into a plurality of pixels of the touch display panel 100 during the display driving period, so as to display images.

During the touch driving period, the common electrodes CE_1_1-CE_s_t may serve as the sensing electrodes of the touch display panel. The driving circuit, which will be elaborated hereinafter, is able to output driving signals to the driving electrode lines of the touch display panel 100 (i.e., the source lines SL_1-SL_m or other additional conductive lines) during the touch driving period, and the sensing circuit, which will also be elaborated hereinafter, is able to sense the common electrodes CE_1_1-CE_s_t during the touch driving period, so as to detect touch events of the touch display panel 100.

Figure 2:
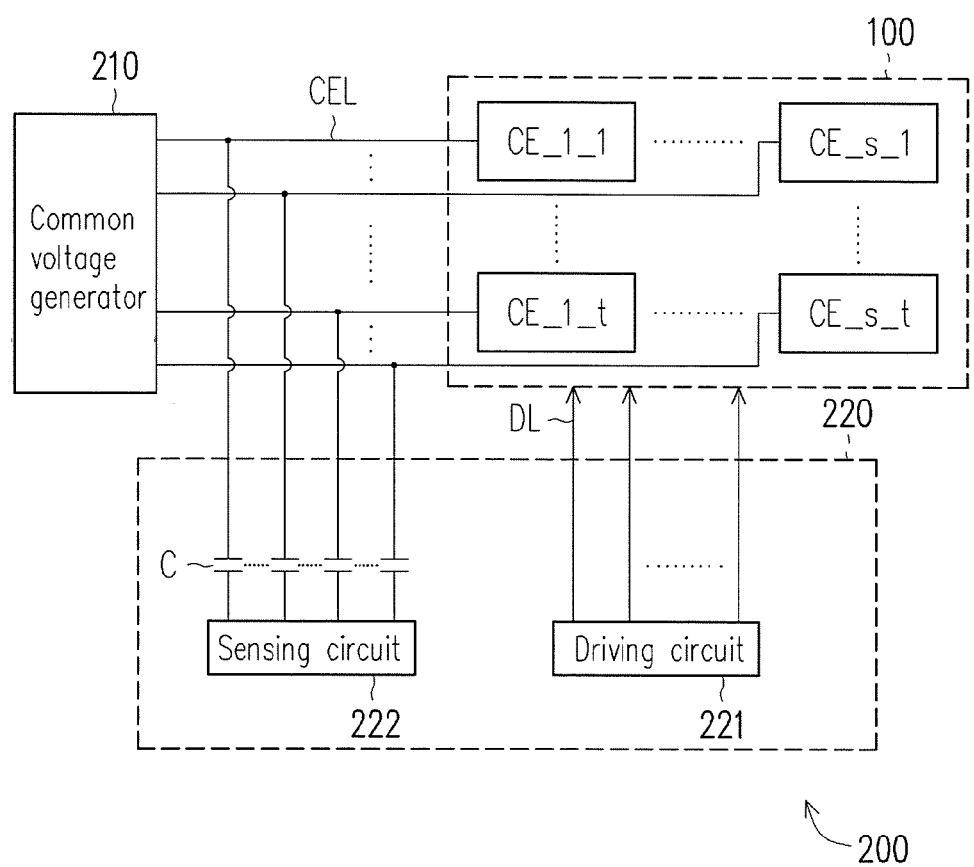
FIG. 2 is a schematic circuit block diagram of a touch display system according to an embodiment of the invention.

FIG. 2 is a schematic circuit block diagram of a touch display system 200 according to an embodiment of the invention. The touch display system 200 shown in FIG. 2 includes a touch display panel 100, a common voltage generator 210, and a touch driving apparatus 220. The touch display panel 100 includes a plurality of pixels, at least one driving electrode line (e.g., the driving electrode lines DL shown in FIG. 2), and at least one common electrode line (e.g., the common electrode lines CEL shown in FIG. 2). The common electrode lines CEL are respectively coupled to the common electrodes (e.g., the common electrodes CE_1_1~CE_s_t shown in FIG. 2) of the touch display panel 100 in a one-to-one manner. As shown in FIG. 2, the descriptions of the pixels of the touch display panel 100, the driving electrode lines DL, and the common electrode lines CE_1_1-CE_s_t may be deduced from the descriptions of the pixels, the driving electrode lines, and the common electrode lines provided in FIG. 1, and therefore no further descriptions will be further given.

As shown in FIG. 2, the common voltage generator 210 is electrically connected to the common electrode lines CEL. The touch driving apparatus 220 includes a driving circuit 221, a sensing circuit 222, and at least one capacitor (e.g., the capacitor C shown in FIG. 2). The output terminals of the driving circuit 221 are coupled to the driving electrode lines (e.g., the driving electrode lines DL shown in FIG. 2) of the touch display panel 100 in a one-to-one manner. A first terminal of the capacitor C is electrically connected to the common electrode lines CEL of the touch display panel 100, and the second terminal of the capacitor C is electrically connected to the input terminal of the sensing circuit 222, as shown in FIG. 2. The descriptions of other capacitors and other common electrode lines may be deduced from the descriptions of the capacitor C and the common electrode lines CEL, and therefore no further descriptions will be further given.

Figure 3:
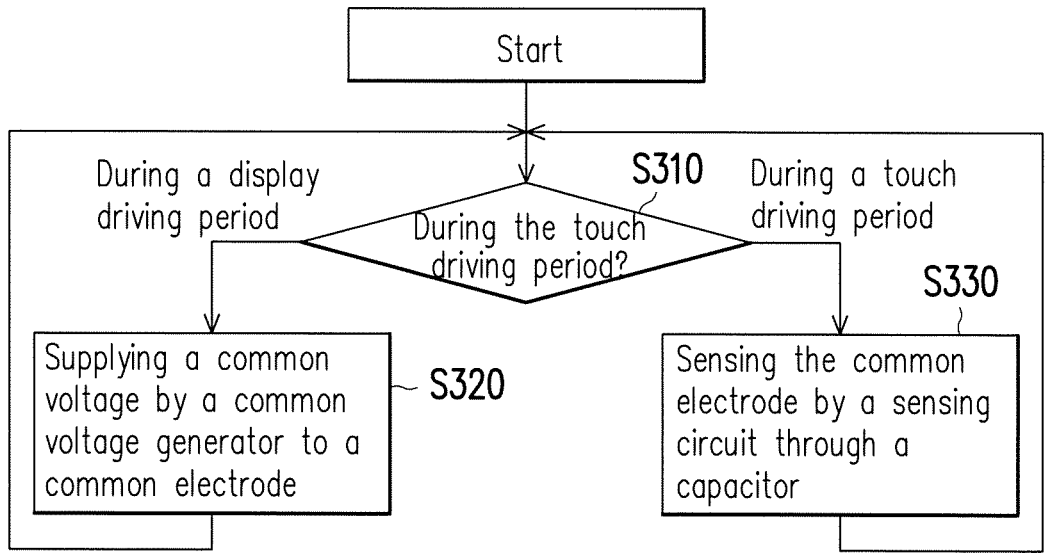
FIG. 3 is a schematic flowchart of a touch driving method of the touch display system as depicted in FIG. 2 according to an embodiment of the invention.

FIG. 3 is a schematic flowchart of a touch driving method of the touch display system 200 as depicted in FIG. 2 according to an embodiment of the invention. In step S310, whether the touch display system 200 is operated in the touch driving period or the display driving period is determined. If the touch display system 200 is operated in the display driving period, the step S320 is performed. If the touch display system 200 is operated in the touch driving period, the step S330 is performed.

In the step S320, i.e., during the display driving period, the common voltage generator 210 supplies a common voltage VCOM to the common electrodes CE_1_1-CE_s_t of the touch display panel 100 through the common electrode lines (e.g., the common electrode lines CEL shown in FIG. 2), and the sensing circuit 222 does not sense the common electrodes CE_1_1-CE_s_t during the display driving period. The common voltage generator 210 may be implemented in various ways. For instance, in some embodiments of the invention, the common voltage generator 210 may be implemented in form of a conventional common voltage generating circuit.

In step S330, i.e., during the touch driving period, the common voltage generator 110 does not supply the common voltage VCOM to the common electrodes CE_1_1-CE_s_t. During the touch driving period, the driving circuit (i.e., the TX circuit) 221 outputs the driving signal to the driving electrode line (e.g., the driving electrode lines DL shown in FIG. 2) of the touch display panel 100. Based on design requirements, the driving electrode lines DL of the touch display panel 100 may be the source lines SL_1-SL_m shown in FIG. 2 or conductive lines (not shown) that are additionally arranged in the touch display panel 100. The capacitor C can filter out a DC portion of the common electrode lines CEL of the touch display panel 100 and transmit an AC portion of the common electrode lines CEL to the sensing circuit 222. The sensing circuit (i.e., the RX circuit) 222 can sense the AC portion of the common electrode lines CEL transmitted by the capacitor C during the touch driving period. Hence, the sensing circuit 222 can sense the common electrode CE_1_1 through the capacitor C and the common electrode lines CEL, so as to detect the touch event of the common electrode CE_1_1 of the touch display panel 100. The descriptions of other capacitors, other common electrode lines, and other common electrodes may be deduced from the descriptions of the capacitor C, the common electrode lines CEL, and the common electrode CE_1_1, and therefore no further descriptions will be further given. The driving circuit 220 and the sensing circuit 222 may be implemented in various manner. For instance, in some embodiments of the invention, the driving circuit 220 and the sensing circuit 222 may be implemented in form of a conventional touch driving circuit and a conventional touch sensing circuit.

In general, the source driver (not shown) of the touch display panel 100 is manufactured by performing a high-voltage process, so as to output the high voltage to drive the pixels P_1_1-P_m_n. For instance, the voltage swing of the source lines SL_1-SL_m may be 0V-15V, and the common voltage VCOM of the common electrodes CE_1_1-CE_s_t may be 8V. The capacitor C is applied to isolate the DC portion of the voltage of the common electrode CE_1_1 and the DC portion of the voltage of the sensing circuit 222; thereby, the common voltage VCOM of the common electrodes CE_1_1-CE_s_t shown in FIG. 2 may be greater than the operating voltage of the sensing circuit 222. The sensing circuit 222 can then be manufactured by performing a low-voltage process, and the issue of causing damage to the sensing circuit 222 by the high voltage of the common electrodes CE_1_1-CE_s_t can be prevented. Compared to the integrated circuits made by performing the high-voltage process, the integrated circuits made by performing the low-voltage process are often cost-effective and reduce power consumption.

Figure 4:
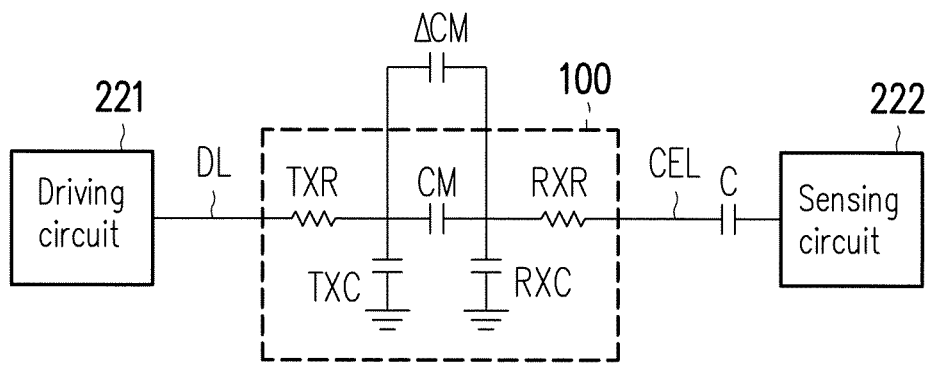
FIG. 4 is an equivalent circuit diagram of the touch display panel depicted in FIG. 2 during a touch driving period.

FIG. 4 is an equivalent circuit diagram of the touch display panel 100 depicted in FIG. 2 during a touch driving period. The "CM" shown in FIG. 4 represents the mutual capacitance between the common electrode CE_1_1 and the corresponding driving electrode line, the resistor TXR represents the parasitic resistance of the electrical path from the driving circuit (i.e., the TX circuit) 221 to the corresponding driving electrode line (e.g., the driving electrode line DL shown in FIG. 2), and the capacitor TXC represents the parasitic capacitance of the electrical path from the driving circuit 221 to the corresponding driving electrode line (e.g., the driving electrode line DL shown in FIG. 2). The resistor RXR represents the parasitic resistance of the electrical path (e.g., the common electrode lines CEL shown in FIG. 2) from the sensing circuit (i.e., the RX circuit) 222 to the common electrode CE_1_1, and the capacitor RXC represents the parasitic capacitance of the electrical path (e.g., the common electrode lines CEL shown in FIG. 2) from the sensing circuit (i.e., the RX circuit) 222 to the common electrode CE_1_1. The "$\Delta$CM" shown in FIG. 4 represents the varying amount of the capacitance of the touch point where an object touches the touch display panel 100 (i.e., when the touch event occurs). Whether the touch even occurs or not can be learned by detecting the mutual capacitance CM and the varying amount $\Delta$CM of the capacitance.

The capacitance of the capacitor C can be determined according to the design requirements. In some embodiments of the invention, the capacitance of the capacitor C can be much greater than the to-be-detected mutual capacitance CM; for instance, the capacitance of the capacitor C can be 10 times greater than the mutual capacitance CM. Since the to-be-detected mutual capacitance CM is much less than the capacitance of the capacitor C, the variation in the overall equivalent capacitance is mostly the variation in the mutual capacitance CM. Hence, if the capacitor C is serially connected in the sensing path of the sensing circuit 222 does not pose any impact on the to-be-detected mutual capacitance CM. In some embodiments of the invention, the capacitance of the capacitor C may approach the to-be-detected mutual capacitance CM; for instance, the capacitance of the capacitor C can be 10 times less than the mutual capacitance CM.

The capacitor C with the relatively small capacitance may achieve the effects of attenuating the signals and reducing the noise, such that significant external noise can be prevented from saturating the sensing circuit 222. Through the adjustment of the capacitance of the capacitor C, different design requirements can be complied with, and desirable effects can be achieved. According to some embodiments of the invention, the capacitor C and the sensing circuit 222 can be both arranged in the same touch integrated circuit. By contrast, in some embodiments of the invention, the capacitor C may be an external capacitor device of the touch integrated circuit (e.g., the sensing circuit 222).

To sum up, according to an embodiment of the invention, the capacitor C is employed to filter out the DC portion of the common electrode line CEL of the touch display panel 100 and transmit the AC portion of the common electrode line CEL to the sensing circuit 222 of the touch driving apparatus 220. Hence, the touch driving apparatus 220 may be manufactured by performing a low-voltage process and can employ the common electrode CE_1_1 with the high voltage as the touch sensing electrode.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A touch driving apparatus comprising:
   a driving circuit, an output terminal of the driving circuit being electrically connected to a driving electrode line of a touch display panel, so as to output a driving signal to the driving electrode line during a touch driving period;
   a capacitor, a first terminal of the capacitor being electrically connected to a common electrode line of a plurality of pixels of the touch display panel; and
   a sensing circuit, an input terminal of the sensing circuit being electrically connected to a second terminal of the capacitor, such that the sensing circuit senses the common electrode line through the capacitor during the touch driving period to detect a touch event of the touch display panel.

2. The touch driving apparatus of claim 1, wherein the common electrode line is further electrically connected to a common voltage generator, during a display driving period, the common voltage generator supplies a common voltage to a common electrode of the pixels through the common electrode line and the sensing circuit does not sense the common electrode, and during the touch driving period, the common voltage generator does not supply the common voltage to the common electrode and the sensing circuit senses the common electrode through the capacitor and the common electrode line, so as to detect the touch event.

3. The touch driving apparatus of claim 2, wherein the common voltage is greater than an operating voltage of the sensing circuit.

4. A touch driving method comprising:
   outputting a driving signal to a driving electrode line of a touch display panel by a driving circuit during a touch driving period;
   filtering out a direct-current portion of a common electrode line of a plurality of pixels of the touch display panel and transmitting an alternating-current (AC) portion of the common electrode line by a capacitor; and during the touch driving period, sensing the transmitted AC portion of the common electrode line by a sensing circuit, so as to detect a touch event of the touch display panel.

5. The touch driving method of claim 4, further comprising:

supplying a common voltage to a common electrode of the pixels by a common voltage generator through the common voltage line during a display driving period, wherein the sensing circuit does not sense the common electrode during the display driving period; and not supplying the common voltage to the common electrode during the touch driving period, wherein the sensing circuit senses the common electrode through the capacitor and the common electrode line during the touch driving period, so as to detect the touch event.

6. The touch driving method of claim 5, wherein the common voltage is greater than an operating voltage of the sensing circuit.

7. A touch display system comprising:

a touch display panel comprising a plurality of pixels, at least one driving electrode line, and at least one common electrode line;

a common voltage generator electrically connected to the at least one common electrode line; and a touch driving apparatus comprising a driving circuit, a capacitor, and a sensing circuit, wherein an output terminal of the driving circuit is electrically connected to the at least one driving electrode line, so as to output a driving signal to the at least one driving electrode line during a touch driving period, a first terminal of the capacitor is electrically connected to the at least one common electrode line of the pixels, and an input terminal of the sensing circuit is electrically connected to a second terminal of the capacitor, such that the sensing circuit senses the common electrode line through the capacitor during the touch driving period to detect a touch event of the touch display panel.

8. The touch display system of claim 7, wherein during a display driving period, the common voltage generator supplies a common voltage to a common electrode of the pixels through the at least one common electrode line and the sensing circuit does not sense the common electrode, and during the touch driving period, the common voltage generator does not supply the common voltage to the common electrode and the sensing circuit senses the common electrode through the capacitor and the at least one common electrode line, so as to detect the touch event.

9. The touch display system of claim 8, wherein the common voltage is greater than an operating voltage of the sensing circuit.

* * * * *